Sept. 20, 1966  E. M. BURDICK  3,274,072
METHOD FOR TREATING PAPAYA PLANTS TO RECOVER
DESIRED CONSTITUENTS THEREFROM
Filed July 20, 1964  7 Sheets-Sheet 4

Everette M. Burdick
INVENTOR.

BY
ATTORNEYS

Everette M. Burdick
INVENTOR.

Everett M. Burdick
INVENTOR.

United States Patent Office 3,274,072
Patented Sept. 20, 1966

3,274,072
METHOD FOR TREATING PAPAYA PLANTS TO RECOVER DESIRED CONSTITUENTS THEREFROM
Everette M. Burdick, 4821 Ronda St., Coral Gables, Fla.
Filed July 20, 1964, Ser. No. 383,697
7 Claims. (Cl. 195—2)

The present application is a continuation-in-part of my prior copending application Serial No. 1,050, filed January 7, 1960, now United States Letters Patent No. 3,141,832.

The present invention relates to a method for treating papaya plants and recovering desired constituents therefrom. The term papaya plants as used in the following specification and claims includes all of the species of papaya including by way of example, *Carica papaya*, Linn. family Caricaceae, *Carica candamarcencis*, Hook., *Carica dodecaphylla*, *Carica quericifolia*, Solms., *Carica hastaefolia*, Solms., *Carica gracilis*, Solms., *Carica monoica*, *Carica Cauliflora*, *Carica chrysopeals*, *Carica pentagona*, *Carica papaya*, Gaertn., *Vasconcellosia hastata*, Caruel, and Apocynaceae.

Papaya has been recognized as a source of desired products such as proteolytic enzymes, animal feedstuffs, chlorophylls, carotenes, xanthophylls, phytol, and carpaines; however, prior to the present invention, no process was available for recovery of all these constituents without destroying or interfering with the recovery of one or more of the other constituents.

Therefore, a primary object of the present invention is to provide a method of treating papaya plants to recover desired constituents therefrom without destroying or interfering with the recovery of other desired constituents.

A further object of the present invention is to provide a method for treating papaya plants and recovering proteolytic enzymes and carpaines therefrom.

Still another object of the present invention is to provide a method for treating papaya plants to recover a liquid and a coagulate therefrom and separating the proteolytic enzymes and carpaines from the liquid and the carotenoids and chlorophylls from the coagulate.

A further object of the present invention is to provide a method of recovering carotenoids, chlorophylls and impure phytol from papaya plants.

Still another object is to provide a method of recovering both oil soluble and water-soluble chlorophylls from papaya plants.

Still a further object of the present invention is to provide a method of recovering chlorophylls, carotenoids, and carpaines from papaya plants.

Yet a further object of the present invention is to provide a method of recovering proteolytic enzymes from papaya plants and also carpaines, carotenoids, and chlorophylls.

The present invention also relates to a process of recovering enzymes and other valuable constituents from immature, or mature, papaya plants in a manner which preserves, protects, activates, and otherwise liberates the desirable constituents from the plants.

Other objects and advantages of the present invention will become more apparent from a consideration of the following description and schematic flow sheets wherein.

Figure 1:
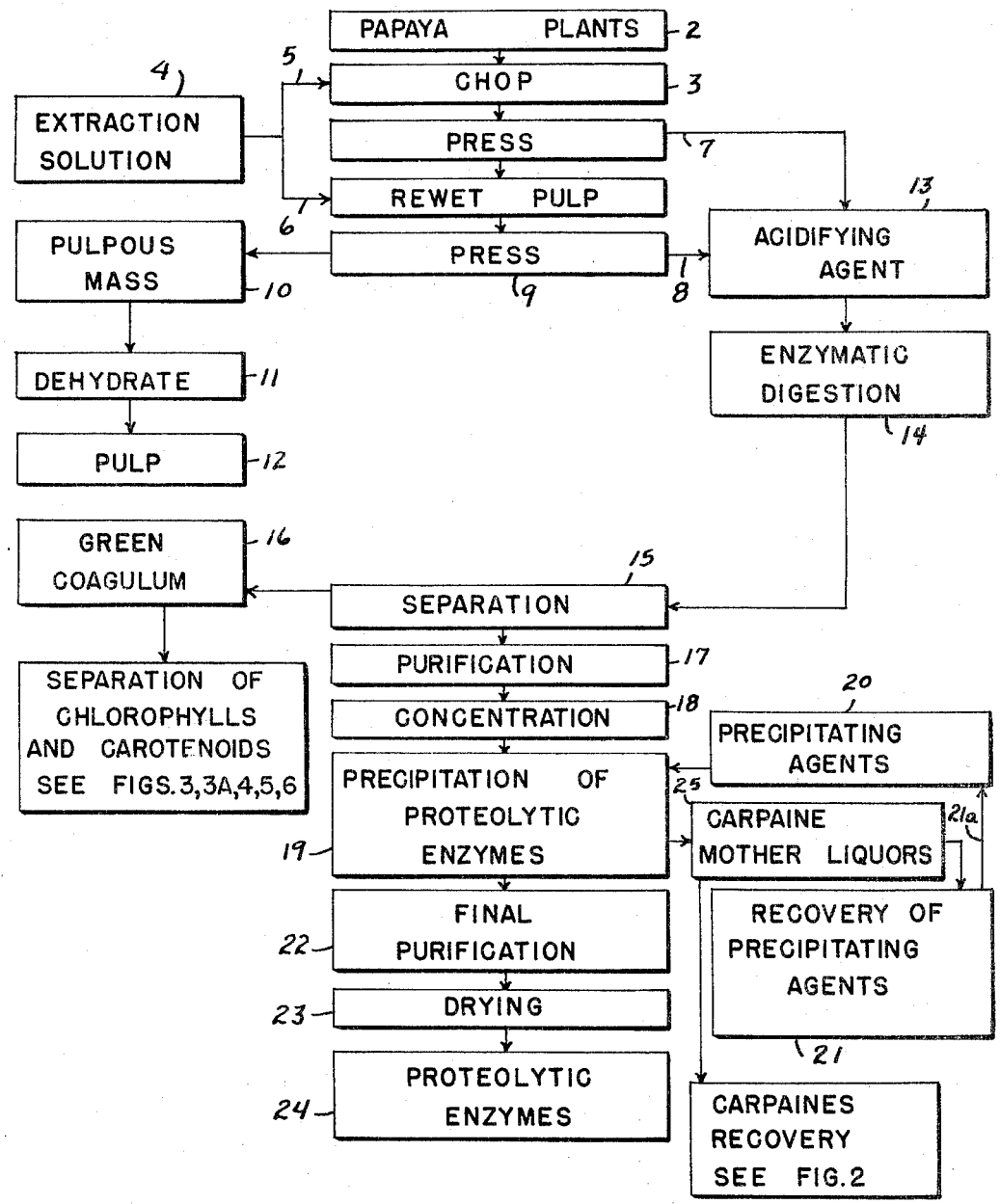
FIG. 1 is a schematic diagram representing a method of treating the plants to obtain a liquid and a coagulate as well as the method of treating the liquid to recover the proteolytic enzymes therefrom.

A suitable method of growing or cultivating papaya plants is described in said above referred to patent, and it can be appreciated that variations in the method of growing and cultivation can be utilized without departing from the scope of the present invention.

When the plants are of a suitable height, such as, for example, about 2 to 3 feet tall, they may be harvested mechanically by a conventional forage harvester or by any suitable other means, and the plants may be cut a suitable height above the ground so that the roots may put out new tops, such as by way of example, anywhere from 9 to 12 inches above ground.

As the plants are harvested, it may be advisable to spray the chopped plants with a suitable quantity of preserving solution; such preserving solution may comprise, by way of example, a mixture of ammonia, sulfites, and sulfides in the amount of 0.1% of each by weight. Where the preserving solution is used, the concentration may vary without departing from the scope of the invention but may be restricted by various economic factors. Preferably, the pH of the spraying solution is slightly alkaline or neutral, and a pH range of 7 to 9 is satisfactory.

It is not necessary or critical to the present invention to spray the plants as they are harvested, but the yield of valuable constituents obtained from the harvested or chopped plant may be reduced in some instances where the preserving solution is not utilized.

In addition, it should be further noted that the present process is quite suitable not only for recovering carpaines and other valuable constituents from green immature papaya plants, but the more mature or older papaya plants that have been raised primarily for fruit may also be used in practicing the present invention.

Attention is now directed to the schematic flow diagram, and it is to be noted that the harvested plants are represented generally by the numeral 2 and after harvesting may be chopped or macerated as represented by the numeral 3. Where the preserving solution is used, it may be employed by placing it on the papaya plants preferably soon after they are cut or as they are cut or harvested. After chopping the plants, they may be treated with a small quantity of extraction solution to prevent undesirable effects of oxidation and enzyme inactivation. Here again, this step may be eliminated without departing from the scope of this invention. The extraction solution may be added in any suitable manner, and it has been found that spraying the chopped plants with the extraction solution is quite satisfactory. Of course, the chopped plants could be dipped in the extraction solution, or the extraction solution may be applied in any one of several other ways.

Any alkaline enzyme protecting solution may be used as the extraction solution, and one which forms the function of a reducing or antioxidizing agent and a solubilizing or peptizing agent for aiding in the protection, liberation, and activation of the proteolytic enzymes is satisfactory. By way of example, some suitable reducing or antioxidizing agents which have been found suitable are the sulfites and bisulfites of sodium and potassium, sulfur dioxide, the sulfides and hydrosulfides of ammonium, sodium, and potassium, hydrogen sulfide, glutathionine, methionine, cysteine, thioglycolates, and cyanides. Out of this group, the sulfites and bisulfites of sodium and hydrosulfides of ammonium and sodium are preferred, but the others may be used if desired.

Among the papain-like enzyme activators which have been found suitable, there are, by way of example, the sulfites of sodium and potassium, the sulfides of sodium and potassium, the bisulfites of sodium and potassium, hydrosulfides and sulfides of ammonium, sodium, and potassium, certain chelating agents (versene, sequestrene) like diethylenetetra amino acetic acid and its soluble salts, hydrocyanic acid and its sodium and potassium salts. Among this group, the sulfides of sodium, the bisulfites of sodium, hydrosulfides of ammonium and diethylenetetra amino acetic acid and its soluble salts are preferred.

Among the solubilizing or peptizing agents, the following are desirable—chlorides of sodium and ammonium, phosphates of sodium and potassium, various meta- and polyphosphates of sodium and potassium, sodium citrate, hydrotropic agents such as sodium benezene sulfonate and sodium paracymene sulfonate. Among these, the chlorides of sodium and ammonium, polyphosphates of sodium, and sodium citrate are preferred. Also, sodium sulfite, the bisulfides and sulfides of ammonium and sodium, and ascorbic acid and its soluble salts are quite satisfactory. Generally speaking, any dilute salt solution will function satisfactorily.

Concentration of the chemicals may be in the neighborhood of 0.1% by weight, and concentrations in the range of 0.1% to 0.25% by weight are satisfactory. Lower concentrations are generally ineffective, and higher concentrations are not necessary to accomplish the results.

After the chopped mass of green papaya plants has been thoroughly moistened, they are next treated to separate a liquor or liquid from the pulpous mass of the papaya plants; any suitable means may be used to separate the liquids from the pulp, such as by way of example, pressing. Where pressing is employed, it may be accomplished by any suitable apparatus, such as a filter press or the like to separate the liquid from the pulp. Of course, the liquid may be extracted by any means, mechanical or chemical, which does not have deleterious effects on the desired constituents to be recovered.

It is desirable to rewet the pulpous mass with the extraction solution in order to extract more of the proteolytic enzymes and other constituents, and this may be done by adding to the wet pulp a volume of the extraction solution about equal to the volume of liquid obtained in the first pressing operation. The rewet pulp is then pressed as before to obtain a second portion of liquor and the resulting pulpous mass.

The pulpous mass may be dehydrated in a conventional dehydration kiln to make papaya pulp which can be used as an animal feedstuff which contains a good amount of protein and is quite rich in carotene or provitamin A. In the flow sheet, the extraction solution is illustrated by the numeral 4, and it can be seen that it is added as illustrated at 5 to the chopped papaya plants and is added as illustrated at 6 to the rewet pulp.

After the pressing to separate the liquid from the pulp, the pressings yield 75% to 90% of the total desired constituents. The liquids are combined as illustrated at 7 and 8 for subsequent processing. The pulpous mass obtained from the press 9 is represented at 10 and as noted above is dehydrated at 11 to produce the animal feedstuff represented by the numeral 12.

The two pressings of the plants yield 75% to 90% of the total desired constituents available from the plants, and while more rewettings and pressings give higher yields, the purification difficulties of the enzymes later in the process appear to be increased.

Of course, the number of rewettings and pressings may be varied as desired.

The combined liquors or liquids represented at 7 and 8 from the pressing may be green in color and may have a pH in the neighborhood of 8. At any event, regardless of the color and regardless of the pH, the pH of the liquid is adjusted to between 4.0 and 4.5 by the addition of an acidifying agent as represented by the numeral 13 in the drawing. The acidifying agent may be any suitable acid such as hydrochloric, sulfuric, acitic citric, or phosphoric, by way of example only.

After the pH of the liquid has been adjusted, the liquid is digested preferably by carefully raising the temperature to approximately between 40° and 55° C. In this regard, it should be noted that any localized overheating of the liquid will tend to destroy the proteolytic enzyme activity. Papain, like all enzymes, is destroyed by heat, but at temperatures below 55° C., the rate of destruction is quite low while at higher temperatures the rate of destruction increases rapidly. The heating of the liquid effects enzymic digestion which liberates and otherwise activates the proteolytic enzymes and at the same time causes a coagulation of the protein impurities.

The enzymic digestion is continued until proper coagulation has been obtained, and I have determined that the time required to produce the desired results usually is between 10 and 30 minutes depending upon the particular papaya plants from which the liquids were obtained. In this regard, if the temperature of the liquid is raised carefully and uniformly, the coagulation will be effected at the lowest possible temperature thereby producing the most active papain from the plants.

The time of heating and the temperature of heating is not critical except that where heating is employed, it must be accomplished in a manner so as to not destroy the proteolytic enzyme activity as the coagulate is being formed. Generally speaking, it is undesirable to heat the liquid to more than 55° C. where it is desired to recover the papain. It can be appreciated that the heating can be carried out at temperatures below 40° C. and over an extended period of time, if desired, one of the primary factors being that the liquid must be digested until a coagulate is formed.

Once the coagulate has been formed, the coagulate can be separated from the liquid by any suitable means such as filtration, centrifugation, or simple settling. The formation of the coagulate may be termed a break which is clearly visible to the eye in that the liquid seems to curdle and separate into coagulum which may be green in color and a clear solution. Of course, any suitable instrumental means may be used to determine the occurrence of this phenomenon.

Since the coagulate is mainly protein, it may be advisable to add some filter aid at this point in order to effect more rapid filtration and optimum clarification of the liquid. The clarified liquid can be further purified by treatment with activated carbons and/or filter aids to produce a relatively sparkling clear solution or liquid which may then be concentrated from their 3% to 5% solids content to some 30% or 50% solids content by means of vacuum concentration. In this regard, it should be again noted that temperatures above 55° C. should be avoided if it is desired to recover the proteolytic enzymes from the liquid phase since temperatures above this increase loss in enzymic activity.

In the flow diagram, the enzymatic digestion is represented by the numeral 14 and the separation at 15. The coagulate illustrated at 16 is a rich source of chlorophylls, carotenes, xanthophylls, and protein.

My copending applications Serial No. 383,889, Serial No. 383,890, and Serial No. 383,891 entitled, respectively, "Method of Recovering Carpaine From Papaya Plants," "Method for Recovering Chlorophylls from Papaya Plants," and "Method for Recovering Carotenoids and Phytol From Papaya Plants" describe and claim a process of recovering these products from the green coagulum and the liquid.

After the liquids have been purified and concentrated, as represented at 17 and 18, respectively, the proteolytic enzymes may be separated therefrom by various procedures. For example, the proteolytic enzymes can be precipitated by salting out agents and by certain water miscible organic solvents as represented at 19 and 20.

The latter produces a better product in that it is purer, while the former seems to be more economical, and either may be used in the production of various grades of proteolytic enzymes from papaya plants as necessary.

Precipitation of the proteolytic enzymes from the clarified concentrated syrup may be effected by means of ammonium sulfate as described in my United States Letters Patent No. 3,141,832.

Precipitation of the proteolytic enzymes from the clarified concentrated syrup can also be effected by certain water miscible organic solvents such as methanol, ethanol, isopropanol, and acetone which have all been found to be quite effective. In this regard, it should be noted that it is necessary to add sufficient solvent to the concentrated enzyme solution to produce an organic solvent concentration of about 70% whereupon a flocculent precipitate forms which may be separated, washed with fresh solvent and finally dried to produce high quality proteolytic enzymes. The use of water miscible organic solvents to precipitate the proteolytic enzymes has another distinct advantage of permitting the recovery of the mother liquid syrup which is the rich source of the papaya alkaloid cahpaines and valuable nutrients which can be added back to the papaya pulp feedstuff.

As noted at 22, the proteolytic enzymes may be subjected to the acetone purification noted hereinabove if desired, and thereafter it may be dried by any suitable means as represented at 23 to produce the proteolytic enzyme product represented at 24.

The following examples are given relating to the recovery of proteolytic enzymes:

Example 1

A single young papaya plant about 2 feet tall was cut about 10 inches above the ground. The entire plant, consisting of trunk, leaves, and stems weighing 675 grams, was chopped in a simple food chopper fitted with a tapered screw. The pulpous mass thus produced, along with all expressed liquor, was placed in a cloth bag and then in a stainless steel fruit press provided with a hand operated screw to produce pressure. About 300 ml. of green press liquor was obtained. The pulpous mass was rewet with 300 ml. of extraction solution containing 0.3 gram of sodium metabisulfite, 0.3 gram of tetrasodium diethylenetetraamino acetate, and 0.3 gram of trisodium phosphate. After mixing in well, the rewet mass was again passed through the food chopper. The rewet mass was placed in the cloth bag and pressed as before. Some 320 ml. of green press liquor was obtained. The pulpous mass was dried in an oven to make some 130 grams of papaya pulp which contained some 14% crude protein and 182,000 International Units of provitamin A per pound. The green liquors were combined and subjected to the following enzymatic digestion.

The original pH of 7.9 was lowered to 4.2 by adding citric acid. Heat was applied to raise the temperaure slowly from room temperature up to 35° C.; this took about fifteen minutes, and the solution was agitated slowly. A slight break or separation of the green coagulum could be seen. Heating and agitation were continued for about twenty minutes more, by which time the temperature had reached 45° C. and the green coagulum had clearly separated. Filter aid was added, and the green coagulum was recovered by filtration. A straw colored filtrate was obtained which was further purified by treating with activated carbon and again filtered. The almost colorless purified solution was concentrated in a vacuum of 27 inches of mercury to a thin syrupy consistency. The volume was estimated at about 40 ml. This concentrate was treated with 200 ml. of acetone to precipitate the proteolytic enzymes as a flocculent white mass. The proteolytic enzymes were separated by suction filtration and washed with a small quantity of acetone. Vacuum drying produced 1.08 grams of material which possessed 440 milk clotting units of enzymatic activity.

Example 2

The top was cut off of a mature papaya tree, and portions of the leaves, stems, and trunk were chopped in a food chopper. Two kilograms of the macerated pulp plus drippings were placed in a cloth bag and pressed in a stainless steel fruit press. Approximately 780 ml. of green press liquor were obtained having a pH very close to 6. One liter of extraction solution containing 1 gram of sodium bisulfite, 4.5 ml. of ammonium sulfide solution (22% $(NH_4)_2S$), and enough sodium hydroxide to adjust the pH to 8.5 was used to rewet and thus extract the pressed pulp. The mass was thoroughly mixed and then passed through the food chopper. Upon pressing, almost 1200 ml. of green press liquor was obtained. A portion of the pulp was dried in an oven maintained at 103° C. to produce a sample of papaya pulp of good green color, which was assayed to contain 10.2% crude protein. The press cake was found to contain 68.2% moisture.

The two portions of green press liquors were combined for the heat and enzymatic digestion to solubilize and activate the proteolytic enzymes and to clarify the solution. The pH of the combined green liquors was 8.0 and was adjusted downward to 4.0 by adding dilute sulfuric acid. The solution was mechanically agitated and heat applied to slowly raise the temperature to about 40° C. where it was maintained for 1 hour. Some evidence of the protein break was observed after about ten minutes, and by the end of the digestion, the green coagulum was well formed. It was removed by adding a small amount of filter aid and filtering with suction, and the filter cake washed with a small quantity of distilled water. The filtrate was yellowish orange and had a volume of 2440 ml. This was concentrated in vacuum to about 400 ml. and 2 liters of acetone added to precipitate the proteolytic enzymes as a light tan colored flocculent mass. The proteolytic enzymes were separated by filtration and dried in vacuum. The material was tan colored, but grinding produced a light colored product. The yield was 2.81 grams which were found to have 385 milk clotting units of enzyme activity per gram.

Figure 2:
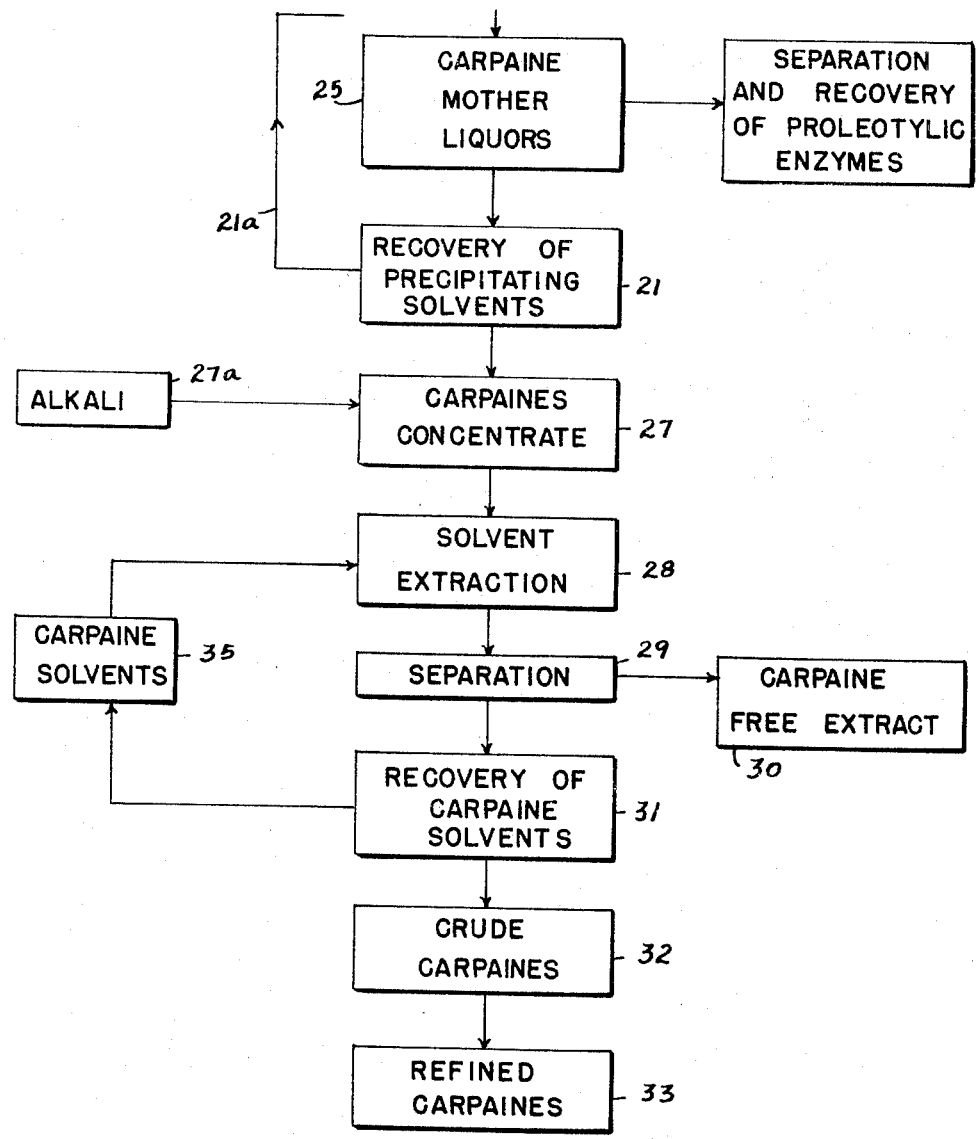
FIG. 2 is a schematic diagram representing a method of treating the liquid to recover carpaines therefrom.

The carpaine mother liquors represented by the numeral 25 in FIGS. 1 and 2 are distilled by conventional means to recover the enzyme precipitating solvent as illustrated by the numeral 21 and return it to the system as shown at 21a in the drawings and to produce carpaine liquor concentrate 27. The carpaine concentrate may be quite acidic, the exact pH of which is dependent upon the amount and kind of acid used in the enzymatic digestion, but generally ranged between 1 and 3.

The pH of the carpaine concentrate represented at 27 is made alkaline by the addition, represented at 27a, of any suitable alkali such as sodium hydroxide, potassium hydroxide, sodium carbonate, potassium carbonate, by way of example. When the carpaine concentrate is alkalinized, it is then solvent extracted with one of the carpaine solvents such as benzene. The capaine solvents per se are well known in the art, and benzene has been found to be quite satisfactory in the process; however, it should be understood that the present invention is not restricted to this particular carpaine solvent as such.

The solvent extraction of the carpaine concentrate is represented by the numeral 28 in the schematic flow sheet FIG. 2, and a simple separation step by any suitable means such as decantation is carried out as represented at 29 to separate the carpaines and solvent from the carpaine free extract portion represented by the numeral 30. The organic solvent and carpaine phase is distilled as represented by the numeral 31 in the flow sheet, at which time the solvent is separated from the crude carpaines represented at 32. The solvent may be conducted back to the portion of the method or process as represented by the numeral 35 for reuse.

The crude carpaines obtained at the portion of the process represented by the numeral 32 may be readily crystallized from organic solvents such as acetone, methanol, ethanol, and low molecular weight ketones. In general, any organic solvent that is water soluble or in which the carpaine is soluble such as ethyl ether will function quite satisfactorily for this purpose.

The refined carpaine is illustrated as having been obtained at 33 in the flow sheet.

The following examples are given by way of illustration only and are not intended as any limiting factor upon the present invention.

*Example 3*

Freshly harvested young payaya plants were chopped and immediately dipped in a solution containing 0.1% of sodium bisulfite, 0.1% of tetrasodium diethylenetetraamino acetate and enough sodium hydroxide to bring the pH to 8.5. After draining off the excess chemical solution, the chopped pieces were thoroughly macerated. A portion of this macerated mixture, weighing 1000 grams was pressed to yield 450 grams (approximately 430 ml.) of green liquor. The remaining pulpous mass was thoroughly mixed with 450 grams of the extracting solution, having the same composition as the above mentioned dipping solution. This mass was then pressed to yield 480 grams of green liquor and about 520 grams of pulpous mass. The above green liquors were combined and the pH was lowered from its original value of 7.8 to 4.2 by adding dilute hydrochloric acid and then 20 grams of filter aid. Mild agitation was started, and the temperature was slowly raised to 45° C. over a period of about thirty minutes, during which time a green coagulum or coagulate formed as described hereinabove. The separation of the green coagulum from the filtrates was accomplished by filtration, followed by washing the coagulum with a small amount of fresh extracting solution.

The resulting filtrates were treated as described hereinabove. Briefly, this consists of a purification of the filtrates following the separation of the green coagulum through the use of activated carbons and filter aids, and concentration of the purified enzyme solution in a vacuum concentration at temperatures preferably not exceeding 55° C. to a relatively thick syrup, the volume of which was estimated to be about 70 ml.; 265 ml. of 95% ethanol to serve as the precipitating enzyme solvent was then added to the concentrated filtrates to form an almost white mass of precipitated enzymes, and the separation of the precipitated enzymes and original filtrates was made by suction filtration.

The ethanolic filtrates remaining after the separation step are combined as the carpaine mother liquors and then subjected to distillation to recover solvents therefrom, which was ethanol in this example, for reuse as the precipitating enzyme solvent. The distillation step also produced a carpaine concentrate having a pH of 3.0 to which an excess of sodium carbonate was added which brought the pH close to 10, that is, definitely alkaline, and this solution was subjected to a simple solvent extraction using 100 ml. of benzene as the carpaine solvent which was recovered by distillation to leave a residue of crude carpaine. The crude carpaine residue was dissolved in 25 ml. of absolute ethanol, filtered, and allowed to crystallize. A yield of 48 mg. of white carpaine was recovered upon separation and drying that melted between 120° C. and 121° C.

*Example 4*

The top of a mature papaya plant was cut off, then chopped into pieces between 1 and 2 inches long, and these were sprayed with a solution containing 0.1% of sodium sulfite and enough ammonium hydroxide to raise the pH to 9.5 to wet and preserve them. These chopped and sprayed pieces were next thoroughly macerated to form a well mixed mass of green papaya plant material. A portion weighing 2000 grams was then pressed to yield 80 grams (about 825 ml.) of a green liquor and a pulpous mass that was rewet with 850 grams of a chemical solution containing 0.1% of sodium sulfite, 0.1% of tetrasodium diethylenetetraamino acetate and enough sodium hydroxide to bring the pH to 8.5 and thoroughly mixed to insure a good extraction of the proteolytic enzymes and carpaines. The mass was again pressed to yield 910 grams (about 880 ml.) of green liquor and about 1090 grams of pulpous mass.

The green liquors obtained by the pressing operations were combined, and the pH lowered from its original value of 7.9 down to 4.4 by the addition of dilute hydrochloric acid. Mild agitation was started and then 40 grams of supercel (filter aid) was added, and the temperature slowly raised from room temperature to 40° C. over a period of about 45 minutes, during which time a visible break occurred; however, the heating was continued until a temperature of 45° C. was reached which was maintained for ten minutes. The separation of the green coagulum from the fluids was accomplished by suction filtration, leaving the filtrate. Purification of the filtrate was accomplished by adding 10 grams of activated carbon, reheating to 40° C. with agitation, holding at this temperature for ten minutes, adding 10 grams of supercel filter aid, and filtering to obtain a practically colorless solution. Concentration was accomplished by distillation of the water under a 27 inch vacuum until a thick syrupy filtrate was produced, the volume of which was estimated at 120 ml. and 600 ml. of methanol was added to serve as the precipitating enzyme solvent.

Filtration was used in the separation step to recover the proteolytic precipitated enzymes which upon washing with a small amount of ethanol absolute and drying yielded 2.88 grams of high quality proteolytic enzymes and constitutes the proteolytic enzyme refining step. The remaining filtrate is the carpaine mother liquors and were fractionally distilled to recover methanol for reuse as the precipitating enzyme solvent, and the still residue constituted the carpaine concentrate. The syrupy carpaine concentrate was transferred to a simple glass solvent extraction apparatus which required the addition of a small amount of water; alkali as potassium carbonate was added to make it definitely alkaline (pH 10), and then exhaustively extracted with 150 ml. of benzene as the carpaine solvent. Separation was automatically accomplished in the glass solvent extractor to produce the carpaine free extract and a benzene extract of the carpaine which was given a steam distillation to recover the solvent (benzene) for reuse and to produce a residue of crude carpaine. This mass of crude carpaine was taken up in 50 ml. warmed acetone, filtered, and allowed to slowly evaporate, whereupon carpaine crystals formed. The crystals were separated by filtration and washed a very small amount of pentane and then dried to yield 108 mg. of refined carpaine.

The green coagulate or green coagulum represented at 16 is treated by the processes illustrated in FIGS. 3 through 6, respectively.

The pH of the green coagulum or coagulate is first of all raised from the range of 4.0 to 4.5 to the range of from 7 to 10, preferably between 8 and 9 by the addition of alkaline substances. Almost any of the cheap nontoxic ones can be used, such as ammonium hydroxide, sodium hydroxide, potassium hydroxide, calcium hydroxide, sodium bicarbonate, and sodium carbonate. Sodium carbonate is preferable primarily because it is quite effective and simple to use. This pH adjustment should be effected as soon as possible to reduce the destructive effects of the acid condition on the chlorophylls and other plant constituents present. If the green coagulum is to be maintained in a moist condition for any length of time, it should also be given a heat treatment or blanch to destroy the enzymes present, especially the remaining proteolytic enzymes and the chlorophyllase (chlorophyllase hydrolyzes phytol from the natural chlorophylls *a* and *b* to form the corresponding chlorophyllides a and b). Temperatures in the range of 90° to 100° C. should be maintained for 1 to 5 minutes and should suffice to accomplish this result.

On the other hand, if the slightly alkaline green coagulum is to be dehydrated immediately by high temperature methods, such as, by way of example, spray drying and drum drying, the heat treatment or blanch can be omitted. In any case, it is desirable to dehydrate the green coagulum as represented at 20a in FIG. 3 and grind it fine enough to permit easy extraction with petroleum ethers or naphthas having a narrow and low boiling range (because of the heat sensitivity of the material being recovered), such as hexane (boiling range between 68° and 71° C.) and textile spirits (boiling range between 69° and 79° C.). Hexane from a source indicated at 21b is preferable primarily because of its commercial availability, high purity, low boiling range, and extracts almost no chlorophyll from well dehydrated plant materials. The hexane extraction step is represented at 22a of FIG. 3.

Colorless hexane of high purity is satisfactory for use in the hexane extraction step 22a to remove hexane soluble impurities, such as fats, oils, waxes, sterols, carotenoids, and other hexane soluble plant constituents. This extraction with hexane is continued preferably only as long as the extracts show that considerable yellow pigments are being removed. This portion represented at 24a from this step is subjected to distillation to recover the hexane which is returned to 21b and the remaining orange-yellow residue is then subjected to treatment to recover the carotenoids as described hereinafter and as claimed in my copending application Serial No. 383,891 filed July 20, 1964 for "Method of Recovering Carotenoids and Phytol From Papaya Plants."

The so-called hexane extracted coagulum represented at 23a is then subjected to a hexane acetone extraction represented at 25a to recover practically all of the chlorophyll originally present in the green coagulum 16, that is 95% to 99%. This step results in a substantially, completely extracted coagulum represented at 26a that is grayish in color and a rich source of papaya plant protein and a chlorophyll extract represented at 27a that is dark green in color and fluoresces a blood red in white light or sunlight. The extracting solution of hexane acetone mixture may vary in acetone content from 5% to 25% by volume, and about 10% by volume has been found quite satisfactory. Some carpaines can be recovered from the extracted coagulum 26a by means of a benzene extraction if its presence is objectionable for certain uses.

Figure 3:
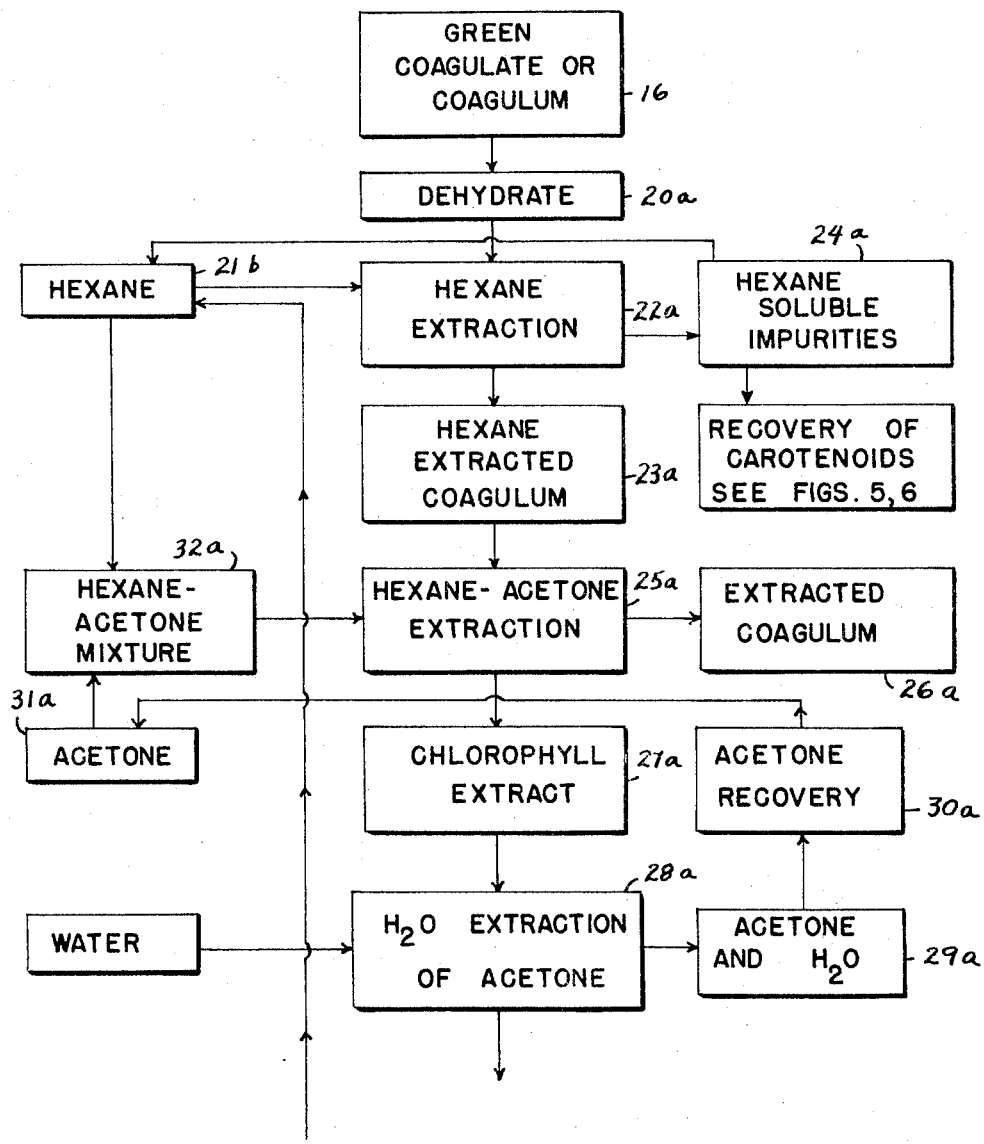
FIG. 3 is a schematic diagram representing a method of treating the coagulate to recover oil-soluble chlorophylls therefrom.
Figure 3A:
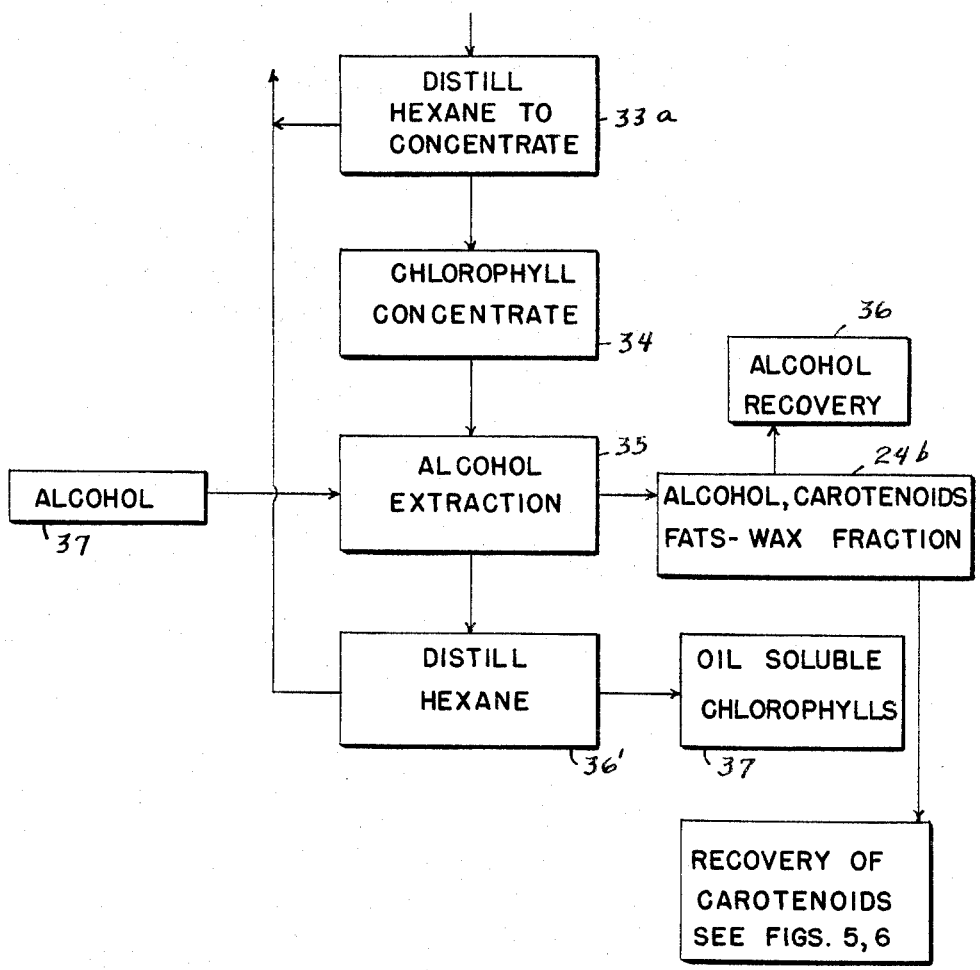
FIG. 3A is a continuation of FIG. 3.

The chlorophyll extract 27a is next given a water extraction represented at 28a to remove or separate the acetone from the hexane as acetone plus water solution shown at 29a. This acetone water solution 29a is fractionally distilled to recover the acetone for reuse. This step is represented at 30a in FIG. 3, and the acetone is conveyed to the acetone storage 31a for remixing with hexane at 32a supplied from supply 21b as shown in FIG. 3 for providing the hexane acetone mixture. The remaining hexane solution of chlorophyll is subjected to a distillation step 33a to concentrate and recover the hexane; this reduces the volume of the solution to between one-third and one-half of its original volume. The hexane recovered at 33a is conveyed back to supply 21b as shown in FIG. 3.

The resulting chlorophyll concentrate represented at 34 may then be extracted with an alcoholic solution such as by way of example, 90% methanol (10% water) as represented at 35 to remove the carotenoids, fats, waxes, and other methanol soluble impurities represented at 24b.

Figure 4:
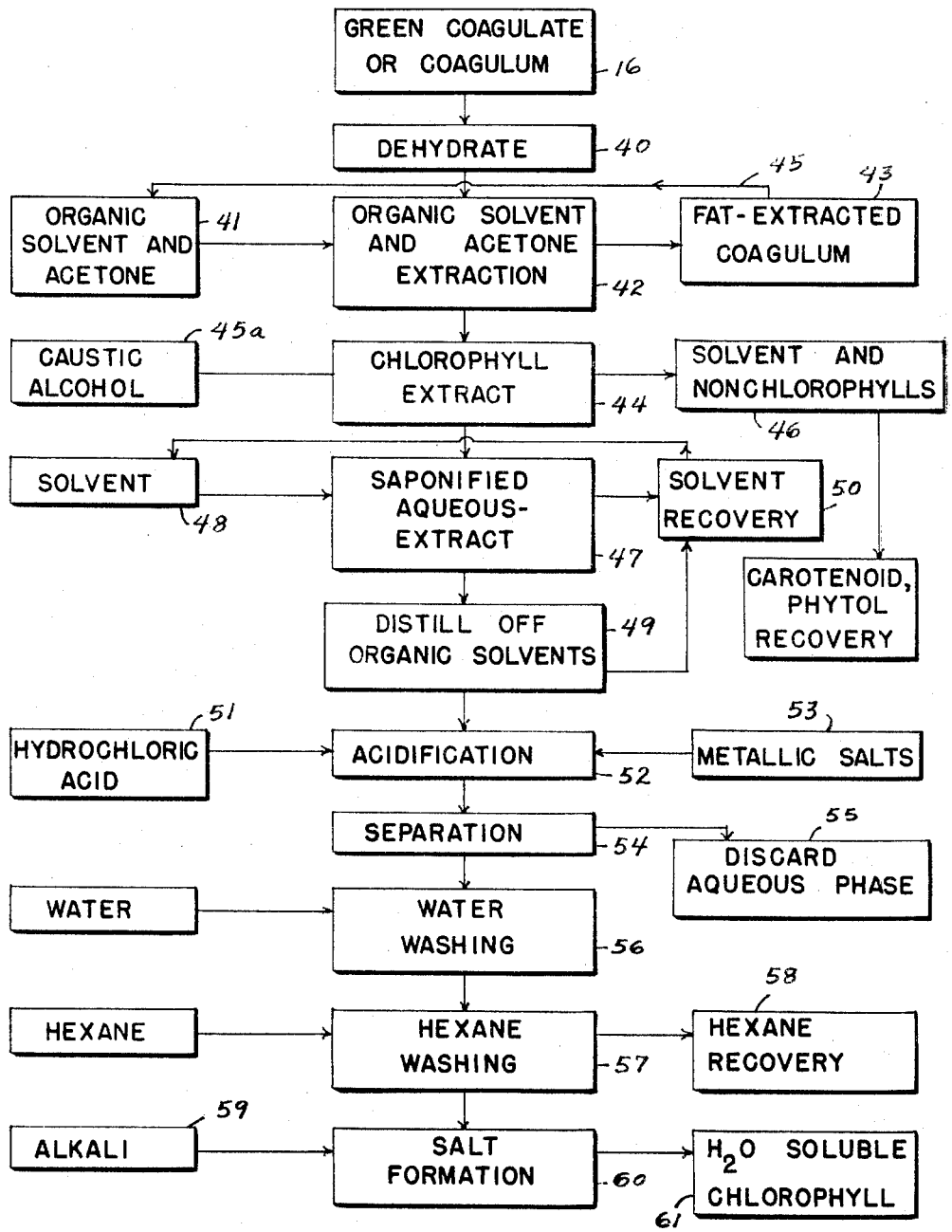
FIG. 4 is a schematic diagram representing a method of treating the coagulate to recover water-soluble chlorophylls therefrom.

The separated phase 24b may be distilled to recover the methanol for reuse as represented at 36, and the methanol conveyed back to methanol supply 37 as shown in FIG. 4. The methanolic extraction step 35 is continued until the desired purity of chlorophyll has been achieved or until colorless extracts are obtained.

The material remaining after the step 35 is subjected to distillation represented at 36' to recover the hexane and return it to source 21b, and the resulting product at 37 is a highly purified and concentrated oil soluble chlorophyll.

The following examples are given only by way of illustrating the foregoing process and are not intended to limit the scope of the present invention.

*Example 5*

Young papaya plants weighing 2000 grams were chopped and then treated to obtain a green coagulate or coagulum as described hereinabove.

The green coagulum was then made into a slurry by the addition of 100 ml. of water containing 0.25 gram of sodium carbonate to make it alkaline and rapidly heated to 95° C. with quite vigorous stirring, where it was held for two minutes before cooling by the application of a vacuum. The cooled mass was then completely dried in a vacuum oven or dehydrated. The dehydrated green coagulum containing some 40 grams of filter aid material weighed 62.4 grams. It was reduced to a fine powder by grinding and then mixed with 200 ml. of hexane and transferred to a suction filter. The filtrate was yellowish. The hexane extraction was continued by the slow addition of several small portions of hexane and when about 200 ml. had been added, the filtrate was showing a slight greenish color. The filtrates were combined and distilled to separate the hexane from the soluble impurities.

The hexane extracted coagulum was made into a slurry by adding 200 ml. of hexane acetone mixture containing 90% hexane and 10% acetone by volume and thoroughly mixed. The filtrate or chlorophyll extract was separated by suction, as before, but it was dark green and was repeatedly passed over the filter cake to extract more and more chlorophyll. The filter cake was then extracted with a fresh 200 ml. portion of 90% hexane 10% acetone mixture, as before, that is, the filtrate was repeatedly recycled over the filter cake. A third 200 ml. portion of the 90% hexane 10% acetone mixture was slowly added to complete the hexane acetone extraction. The hexane acetone filtrates were combined to form the chlorophyll extract. The gray colored filter cake was dried to remove all traces of the solvents to form the extracted coagulum. The chlorophyll extract was thoroughly shaken with 200 ml. of water and allowed to settle to form two layers or phases. The acetone plus water layer was separated, and the water extraction of acetone was continued by two more 200 ml. portions of water. The acetone plus water layers were combined and fractionally distilled as shown by the acetone recovery step to recover acetone for reuse.

The hexane chlorophyll extract freed of acetone was filtered and hexane distilled for the recovery of hexane for reuse and to concentrate the chlorophyll extract to about 200 ml. in volume. This chlorophyll concentrate was then given a methanol extraction by carefully adding 20 ml. 90% methanol with mild agitation and then allowed to settle to form two layers or phases. The aqueous methanol (90% methanol) phase was quite yellow and was drawn off of the bottom as the methanol, carotenoids, fats, waxes, etc. Four more portions of 90% methanol of 20 ml. each were used as before to complete the methanol extraction. The methanolic layers were combined and distilled for the methanol recovery step to recover the methanol and crude carotenoid material. The extracted chlorophyll concentrate was distilled to remove and recover all hexane. The residue was a viscous dark green grease-like mass weighing 4.80 grams constituting the oil soluble chlorophylls, which upon chemical analysis showed it to contain 1.25 grams of pure chlorophyll or 26%.

*Example 6*

A sample of freshly harvested papaya plants including the major portion of the trunks and all of the leaves and stems were chopped into pieces and treated as described hereinabove to obtain a green coagulate or coagulum.

The green coagulum was mixed with 150 ml. of distilled water, and the pH raised to 9.8 by the addition of a sodium hydroxide solution. This alkaline mixture was rapidly heated with good agitation to 95° C. and held at this temperature for 1.5 minutes, then rapidly cooled with the aid of ice water. This heat treated or blanched green mass was dehydrated in a vacuum oven. The dehydrated material was finely ground and mixed with 200 ml. of pure hexane to remove a large portion of the yellows or hexane soluble impurities. The slurry was transferred to a suction filter to separate the yellow extract, and the hexane extraction was completed by slowly adding small portions of fresh hexane to the filter cake until the filtrate began to come through green. This required about 250 ml. of hexane. The hexane extracted coagulum was mixed with 300 ml. of a hexane acetone mixture containing 80% hexane and 20% acetone by volume for approximately 45 minutes. A dark green colored chlorophyll extract was obtained upon suction filtration.

The filter cake was extracted with a fresh 200 ml. portion of the 80% hexane 20% acetone mixture. The filtrate was separated and recycled over the filter cake four times. Fresh 80% hexane 20% acetone mixture was then carefully added in small portions to complete the hexane acetone extraction which was evidenced by an almost colorless filtrate coming through. This required another 300 ml. of the hexane acetone mixture. All of the hexane acetone filtrates were combined to constitute the chlorophyll extract.

A water extraction of acetone to separate the acetone as acetone+water from the chlorophyll extract was accomplished by the addition of 200 ml. of water, followed by agitation for a few minutes, then settling to form two phases or layers. The acetone water layer was separated, and three more 200 ml. portions of water were used, as before, to remove all of the acetone. The aqueous acetone extracts were combined, and the acetone recovered by fractional distillation as in the acetone recovery step. The remaining hexane chlorophyll extract was filtered and distilled to recover methanol and a residue of fatty carophyll extract to approximately 250 ml. in volume. The concentrated chlorophyll extract was mixed with 25 ml. of 90% methanol to effect the first part of the methanol extraction. A total of six more 25 ml. portions of 90% methanol was required to complete the methanol extraction as evidenced by a practically colorless methanolic extract. The last traces of methanol were removed by washing the chlorophyll phase with several portions of water. The methanolic extracts were combined and fractionally distilled to recover methanol and a residue of fatty carotenoid material. Distillation of the hexane permitted its recovery, and a dark green chlorophyll residue weighing 4.52 grams. The entire residue was readily soluble in the common edible oils. Chemical analysis showed it to contain some 1.51 grams of chlorophyll or 33.4% pure.

FIG. 4 represents a flow diagram of the various steps involved in the recovery of water-soluble chlorophylls from papaya plants. The green coagulum 16 is obtained from papaya plants as previously described, and the flow diagram shows the operations and processes necessary from this point on. The pH of the green coagulum 16 is raised from the range 4.0 to 4.5 by the addition of alkalies, as previously explained, to between 7 and 10, preferably approximately 8.5 to reduce the destructive effects of the acidic action on the chlorophylls present. If the green coagulum is to be held in a moist condition for any length of time, it should be heat treated or blanched to destroy the enzymes present as previously described. It is generally necessary as represented at 40 to dehydrate the green coagulum for the recovery of the oil soluble chlorophylls, but dehydration is not required for recovery of the water-soluble chlorophylls since the solvent mixtures used are very effective in the presence of water. However, dehydration is certainly advisable to preserve it if it is not to be extracted for several days or weeks.

Chlorophyll solvents and solvent mixtures suitable in this process include hydrocarbons such as hexane; various chlorinated solvents such as trichloroethylene or perchloroethylene; alcohols such as methanol, ethanol or isopropanol; ketones such as acetone or methyl ethyl ketone and various mixtures of these and other solvents. Although the solvent mixture represented at step 42 is, for purposes of description, a hexane acetone mixture, the method of the present invention with regard to FIG. 4 is not limited to this particular solvent mixture. Most of the water immiscible organic solvents hereinbefore mentioned are quite effective in extracting the fat solubles from thoroughly dehydrated green coagulum 16, but not on the moist or wet green coagulum 16. Dehydration may be a costly operation, and it thus becomes advisable to use a mixture of both water immiscible and water-soluble solvents. Acetone, methanol, ethanol, normal-propanol, and isopropanol are all quite effective in making it possible to use some of the more effective chlorinated hydrocarbons like trichloroethylene and perchloroethylene as mixtures to effect the extraction of the fat soluble plant constituents in the presence of considerable moisture or water content. Acetone is the solvent found best due largely to its relatively low cost, low boiling point, low heat of evaporation, and ease of separation so that it can be fractionally distilled and recovered for reuse.

Thus, the green coagulum 16 is extracted with a mixture of organic solvent plus acetone as above generally described from a supply 41 until practically all of the chlorophylls (95% to 99%) are extracted to yield a fat extracted coagulum represented at 43 and a crude chlorophyll extract represented at 44. All solvents are recovered from the fat extracted coagulum 43 by any suitable means such as simple steam distillation and returned to supply 41 for reuse as shown in FIG. 4 at 45. The chlorophyll liquid extract remaining at 44 is then treated with a strong caustic alcohol solution such as caustic methanol solution from source 45a to effect complete saponification of the chlorophylls present. This process requires only a few minutes, one to five minutes, if good agitation is used and no heat is required, and the following changes occur:

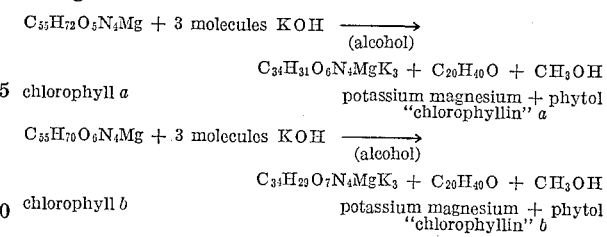

chlorophyll a chlorophyll b

Thus, the chlorophylls are chemically transformed to phytol and the water-soluble potassium salts of the chlorins and rhodins or what are commercially known as the chlorophyllins or water-soluble chlorophylls. Upon settling, the saponification mixture separates into two liquid phases or layers, represented respectively at 46 as the solvent plus nonchlorophylls, which layer contains the carotenoids, fats, waxes, sterols, and other fat soluble impurities and at 47 as the saponified aqueous extract that contains the chlorophylls and also still contains considerable amounts of fat soluble impurities.

The saponified aqueous chlorophyll containing extract 47 is then repeatedly extracted with the particular solvent being used, that is, hexane if a mixture of hexane and acetone was the original extracting solvent mixture or perchloroethylene if a mixture of perchloroethylene and acetone was the original extracting solvent mixture, and so on with other solvent mixtures. This step is represented at 48 and is most important to produce very high purity in the final products and to prevent the formation of troublesome emulsions. The solvents are separated and recovered for reuse by fractional distillation techniques well known to all. This is represented at 49 and 50 in FIG. 4.

The potassium magnesium chlorophyllins result from the distillation of all organic solvents, represented at 49, leaving an aqueous solution that still fluoresces a blood red in sunlight. This material can be concentrated and refined by additional processing with alcoholic and acetone extractions to concentrations above 35%, if desired.

The potassium magnesium chlorophyllins are relatively unstable while the copper chlorophyllins are relatively stable as are several other metallic chlorophyllins, such as cobalt, iron, bismuth, nickel, etc. These various metallic chlorophyllins are made by dissolving the potassium magnesium chlorophyllins in water, adding the desired metal as a water-soluble salt, such as the chloride or sulfate, and acidification with a suitable acid such as hydrochloric acid wherein the pH is gradually lowered to about 1.5 over a period of approximately 6 to 9 hours. The acidification step is represented at 51, 52, and 53.

During this process, the magnesium atom is replaced by the metallic atom, and the potassium salt is converted to the insoluble acid form, and the mixture is subjected to a separation 54 by suitable means as by centrifugation or simple settling. The aqueous phase is discarded as shown at 55, and the precipitate is washed thoroughly with water as shown at 56 and then with fresh organic solvent such as hexane, as illustrated at 57. The hexane is recovered for reuse as represented at 58 by suitable means such as distillation.

All traces of hexane are distilled from the solution of phytochlorins and phytorhodins leaving them in a quite pure form with only a small amount of water. These phytochlorins and phytorhodins are the acid form and must be treated with alkalies such as sodium hydroxide or potassium hydroxide for the salt formation which yields either the sodium or potassium metallic chlorophyllins or the water-soluble chlorophylls, depending upon which metallic salts and hydroxides are used. This step is represented at 59 and 60 in the FIG. 4 drawing. The aqueous solutions of the various chlorophyllins are clarified by filtration or centrifugation to remove all insoluble materials and finally dried by suitable means to produce the commercial chlorophyllins represented at 61.

Thus, if copper sulfate was added as the metallic salt during the acidification step and potassium hydroxide was added as the alkali during the salt formation, the water-soluble chlorophylls would be potassium copper chlorophyllin.

The entire method will be more fully explained and detailed by the following examples which are merely given for purposes of illustration and not by way of limitation.

Example 7

A sample of freshly harvested and chopped papaya plants was treated as described hereinabove to obtain a green coagulate or coagulum.

The wet or moist green coagulum or coagulate was mixed with 0.5 gram of sodium carbonate and then with 1 liter of an organic solvent acetone mixture containing 75% hexane and 25% acetone by volume, stirred, and then filtered. The residue was again mixed or extracted with 500 ml. of the 75% hexane 25% acetone mixture and filtered. This second filtrate was recycled five times over the residue or filter cake. The residue was then extracted with 1 liter of 90% hexane 10% acetone mixture, and the filtrates or extracts recycled five times. The solvent acetone extraction was completed by washing the residue with 500 ml. of 90% hexane 10% acetone mixture to leave the fat extracted coagulum as the residue. All hexane acetone filtrates or extracts were combined to make up the chlorophyll extract which was vigorously mixed with 300 ml. of caustic methanol or methanol saturated with potassium hydroxide for ten minutes. Upon settling for a few minutes, a clear yellow layer of the solvent plus nonchlorophylls formed on the top, and a dark green layer of the saponified aqueous extract containing the potassium magnesium chlorophyllins $a$ and $b$ was extracted three times with (two volumes of) pure hexane as the solvent.

The hexane extracted saponified layer was steam distilled to distill off (practically all) organic solvents. The residue was made up to 300 ml. by the addition of water, and 1.5 grams of pulverized copper sulfate (penta hydrate) was added and dissolved with stirring. The pH of this solution was 9.8, and it was lowered to 5.8 by the addition of 3 normal hydrochloric acid, whereupon a dark green (almost black) precipitate of copper chlorin $e$ and copper rhodin $g$ could be seen. Stirring was continued, and the pH gradually lowered to 4.5 by the addition of 1.5 normal hydrochloric acid over a period of 45 minutes at room temperature where it was held for 2.5 hours. More 1.5 normal hydrochloric acid was added slowly over a period of one hour to lower the pH gradually to 1.55, where it was held for four hours with mild stirring. The precipitated material (mainly copper chlorine and copper rhodin $g$) was separated by centrifugation and water washed with five 100 ml. portions of water. It was then hexane washed with three 100 ml. portions of hexane. The thoroughly washed precipitate was suspended in 30 ml. of distilled water and warmed to 75° C., and a solution of 20% potassium hydroxide carefully added to raise the pH to 11.5. The resulting dark green solution was filtered through asbestos and evaporated to dryness on a steam bath to yield 1.10 grams of potassium copper chlorophyllins that assayed 97% pure.

Example 8

Fifteen hundred grams of immature papaya plants were treated as described hereinabove to obtain a coagulate or coagulum.

The moist green coagulum was mixed with 0.35 gram of sodium carbonate and partially dehydrated on a steam bath. A thick paste-like mass was obtained which was first mixed or extracted with 500 ml. of a solvent mixture containing 75% hexane and 25% acetone by volume, then filtered. The residue was next extracted with 500 ml. of a solvent mixture containing 90% hexane and 10% acetone, and the filtrate was practically colorless—a total of 500 ml. of the mixture was used. Upon drying the residue or fat extracted coagulum weighed 12.2 grams. Chemical assay showed it to have 5.45% nitrogen equivalent to a crude protein content of 34.6%. The filtrates were combined and saponified with 200 ml. of methanol saturated with potassium hydroxide using vigorous agitation at room temperature for approximately ten minutes, followed by settling for about another thirty minutes to completely separate the upper yellow phase and the dark green lower phase containing the water-soluble saponified materials.

The aqueous solvent containing the potassium magnesium chlorophyllins was extracted or washed twice with two volumes of hexane by first mixing and then allowing to settle into two phases which could be separated. The hexane extracted phase was steam distilled to remove practically all of the organic solvents. The crude water soluble potassium magnesium chlorophyllins were diluted with distilled water to a volume of 250 ml. The solution was stirred, and 1.25 grams of copper sulfate was added. A solution of 3 normal hydrochloric acid was slowly added to lower the pH from about 10 to 5.5 at which point a precipitate of the chlorins and rhodins could be seen. The lowering of the pH at this time was further slowed down, and more dilute hydrochloric acid (1.5 normal HCl) was added over a period of about one hour until a pH of 4.5 was reached. Stirring was continued for two hours during which time the pH was maintained at 4.5. The pH was then lowered gradually over a period of close to one hour to 1.5 by the addition of more 1.5 normal hydrochloric acid. Stirring was continued and the pH maintained at 1.5 an additional 3.5 hours. The precipitated copper chlorin e and rhodin g were separated by filtration, and the residue washed with water until the filtrates were practically neutral. It was next washed with small portions of hexane until the filtrates were practically colorless. The residue was suspended in 25 ml. of distilled water and warmed to 75° C.; a solution of potassium hydroxide (20% by weight) was slowly added to raise the pH to 10.5. This solution was filtered through asbestos and dried on a steam bath. The yield was 0.80 gram of 96.5% purity when assayed as potassium copper chlorophyllin.

As previously noted with regard to the recovery of chlorophylls in FIGS. 3 and 4, the pH of the green coagulate or coagulum is first adjusted to between 7 and 10, and the material blanched if it is not to be treated immediately. If the green coagulum or coagulate is to be dehydrated immediately, the blanch may be omitted as previously described with regard to FIGS. 3 and 4.

Figure 5:
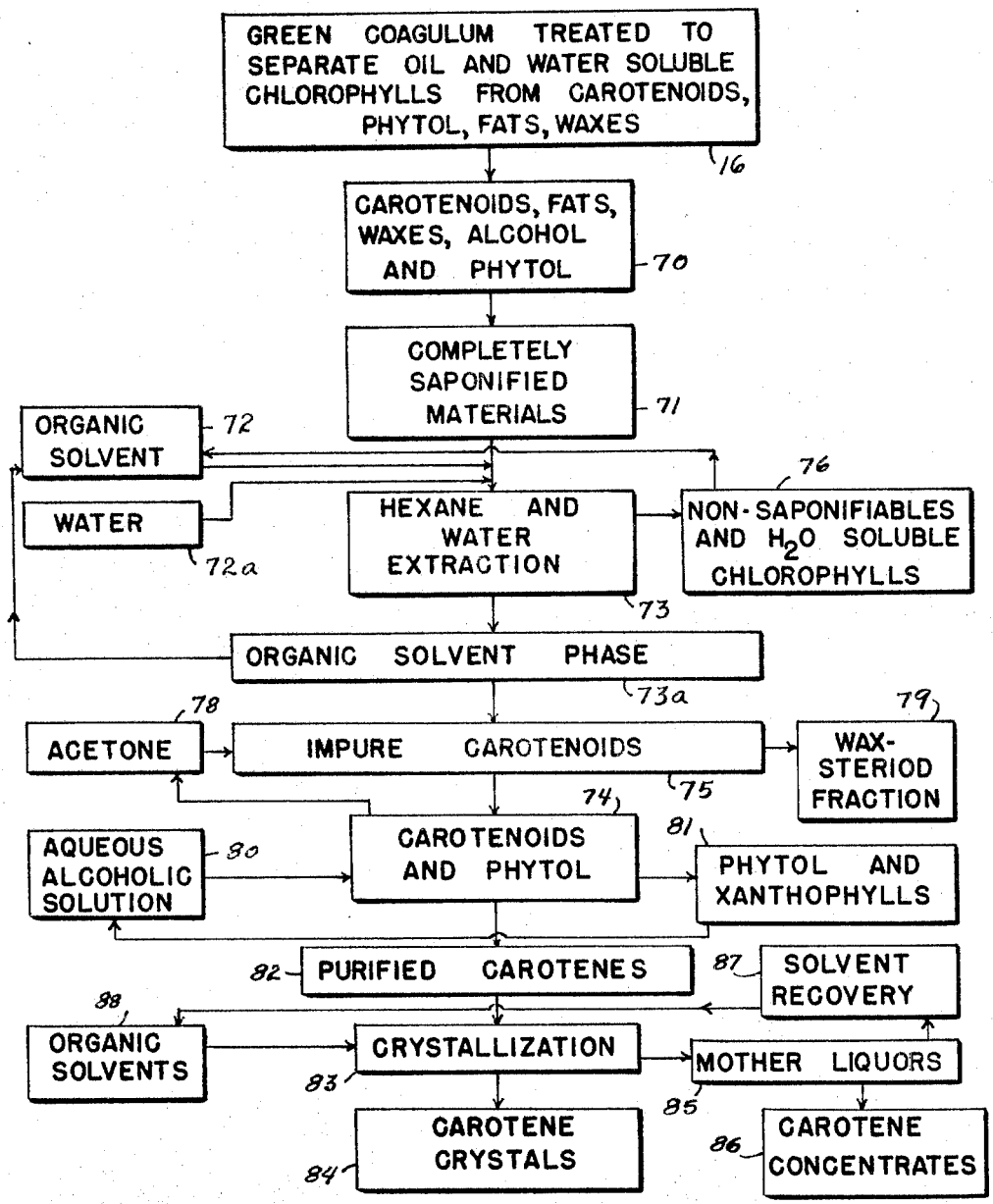
FIG. 5 is a schematic diagram representing a method of treating the coagulate to recover carotenoids therefrom.

Attention is next directed to FIG. 5 of the drawings. The carotenoids, fats, waxes, and other similar matter in the coagulum 16 are separated as represented at 70 from the oil and water soluble chlorophylls present in the coagulum 16 by treatment as described hereinabove and claimed in my copending application Serial No. 383,890 filed July 20, 1964 for "Method for Recovering Chlorophylls From Papaya Plants."

The carotenoids known as carotenes and xanthophylls and impure phytols may be recovered from papaya plants by the method as will be described in FIGS. 5 and 6. The carotenes are highly unsaturated hydrocarbons having the formula $C_{40}H_{56}$, and the principal carotenes found in papaya are alpha-carotene and beta-carotene although there are more than twenty known carotenes at the present time.

The xanthophylls are the oxygen containing carotenoids, that is, they contain the hydroxy, keto, and hydroxy-keto groups, and lutein or leaf xanthophyll in papaya plants.

Phytol also may be recovered from papaya, as will be described.

The carotenoid containing material represented at 70 is saponified in any suitable manner as represented at 71; however, it is desired to assure complete saponification which may also be accomplished in any suitable manner. For example, a large excess of potassium hydroxide may be employed, and the material represented at 70 in FIG. 5 is subjected to boiling temperatures for approximately one-half to two hours and a minimal amount of methanol or just enough to dissolve the excess potassium hydroxide remaining at the end of the reaction.

The completely saponified materials 71 are cooled and dissolved in an organic solvent such as by way of example hexane. The resulting mixture is filtered, and the filtrate extracted with water to remove all traces of water-soluble materials in the steps represented at 72, 72a, 73, and 76 in the drawings. The water-soluble phase and organic solvent phase represented at 73 are separated by decantation or by any other suitable means. The impure carotenoids fraction represented at 75 is obtained by distilling the organic solvent phase 73a and the organic solvent from this source and the organic solvent recovered from the resulting water phase 76 by distillation is returned to the organic solvent source 72. Solvents and low grade water soluble chlorophylls are recovered from the aqueous phase present in the step 76.

The impure carotenoids at 75 are thoroughly mixed with fifteen to twenty times their weight of a solvent, such as by way of example a low molecular weight, water-soluble ketone such as acetone from source 78, and the insoluble waxes, steroids, etc., are separated as shown at 79 as by centrifugation or filtration to produce an acetone extract containing the carotenoids and phytol represented at 74 if the original carotenoid fraction was obtained during the production of the water soluble chlorophylls. Distillation and return of the acetone to source 78 then results in the carotenoids and phytol fraction or residue. As previously mentioned the carotenoids include both the carotene fraction and the xanthophyll fraction.

The carotenoids and phytol residue is then extracted with 5 to 10 times its weight of an aqueous alcoholic solution such as 90% methanol from the source represented at 80 to extract the xanthophylls and phytol represented at 81 and leaving behind the purified carotenes fraction represented at 82. The alcohol in the separated fraction 81 is recovered by distillation and returned to source 80, leaving the impure phytol and xanthophylls fraction 81 which is a good source of both xanthophylls and phytol. Other aqueous alcoholic mixtures having solvent properties similar to those of a 90% methanol solution (i.e., 10% water) can be used such as by way of example ethanol, propanol and isopropanol.

The xanthophyll and phytol extract 81 is treated as will be described in greater detail with regard to FIG. 6

The purified carotenes at 82 are first dissolved in isopropanol with the aid of heat and agitation. Upon cooling and standing, a mass of impure carotene crystals is formed represented at 83. The impure carotene crystals are separated and recrystallized from pentane to produce very pure carotene crystals represented at 84. The mother liquors 85 are reprocessed to obtain more pure crystals and carotene concentrate 86 as well as the organic solvents, isopropanol, and pentane by means well known in the art as illustrated at 87 and 88 in FIG. 5.

Figure 6:
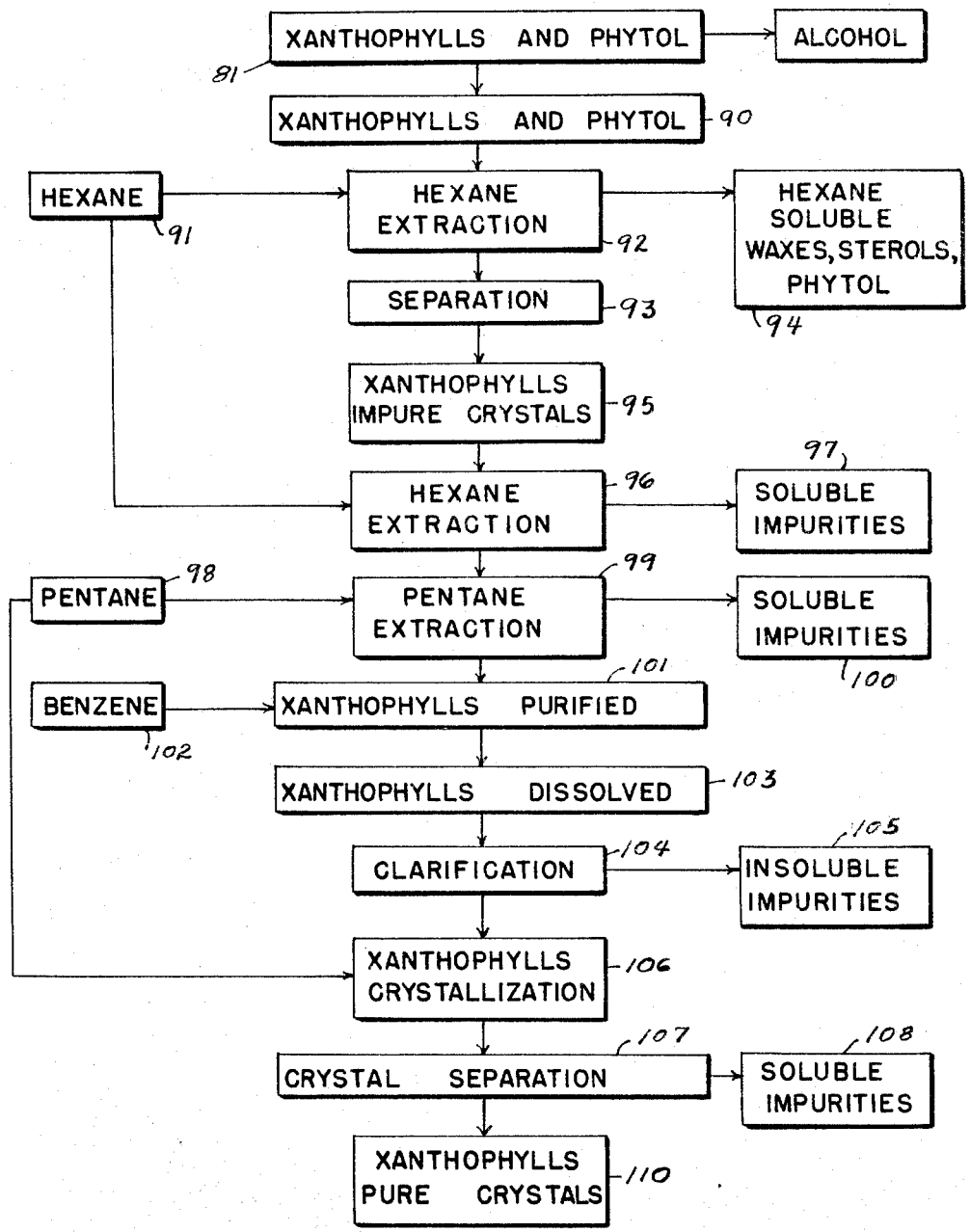
FIG. 6 is a schematic diagram representing a method of treating the coagulate to recover xanthophylls therefrom.

FIG. 6 shows an outlined flow diagram for separating the carotenoid lutein, a xanthophyll from plants and phytol starting with the combined xanthophylls and phytol fraction 81 of FIG. 5. The separation of the carotenoids and phytol fraction at 74 in FIG. 5 into the phytol and xanthophylls fraction 81 and purified carotenes fraction 82 by means of alcoholic extraction has just been explained. It is necessary to remove all of the alcohol from this material which contains in addition to the xanthophylls, phytol, some carotenes, waxes sterols, etc., by suitable means such as distillation as previously noted with regard to FIG. 5.

The alcohol free mixture of impure xanthophylls and phytol is represented at 90 and is thoroughly mixed as shown at 92 with between three and four times its weight of purified hexane from source 91 to dissolve the waxes, sterols and phytol and the solution is filtered or centrifuged to effect the separation 93 rapidly which produces the hexane solubles, sterols, waxes, and phytol, fraction 94 and the impure crystals of xanthophylls 95. This impure crystalline mass of the xanthophylls is repeatedly washed or extracted as represented at 96 with small portions of pure hexane from source 91 until the extracts are colorless. The exact amount of hexane used or the number of extractions will depend entirely upon the amount of impurities in the starting material. These hexane extractions thus remove the hexane soluble impurities represented at 97. Pure pentane from source 98 is then used to wash or extract the impure crystals of xanthophyll as represented at 99 in FIG. 6 of all pentane soluble impurities, just as was done with the hexane. The pentane soluble impurities and pentane are discharged at step 100. The purified xanthophylls represented at 101 are then dissolved in a small amount of benzene from source 102 by the use of both heat and agitation.

The dissolved xanthophylls shown at 103 are then clarified as by filtration or centrifugation represented at 104 to eliminate all insoluble impurities at 105.

Crystallization of the xanthophylls, mainly lutein, is induced by adding pentane from source 98 slowly to the cooled and clarified benzene solution, this step being represented at 106. Preferably, only enough pentane is added to induce the formation of crystals. Crystallization is allowed to continue until the supernatant solution or mother liquor is quite clear and all of the xanthophyll crystals have settled out. The pure xanthophyll crystals represented at 110 are produced by filtering off the mother liquor represented at 107 and washing with a small amount of cold pentane to dissolve impurities represented at 108 and finally drying under vacuum or by infrared heating, preferably in a current of inert gas such as nitrogen or carbon dioxide.

The several steps involved in practicing the present invention will become more obvious and understandable by the following examples which are given merely for purposes of illustration and not by way of limitation.

*Example 9*

A portion of green coagulum weighing 500 grams wet weight that was recovered from green papaya as described hereinabove and was then treated first with five liters of a solvent mixture containing 75% hexane and 25% acetone by volume in the presence of 5 grams of sodium carbonate. After agitating for thirty minutes and allowing to settle, the supernatant phase was separated.

The residue was mixed with 100 grams of filter aid and was treated with a second portion of the 75% hexane 25% acetone solvent mixture, this time being 4 liters, agitating for thirty minutes, and then filtering with suction. The filter cake was washed with 1 liter of 90% hexane 10% acetone solvent mixture. The extracts were combined and filtered. One liter of saturated methanolic potassium hydroxide was added, and the mixture vigorously agitated for fifteen minutes. Upon standing, the aqueous layer of saponified chlorophyll was separated from the hexane layer, which hexane layer was then washed with water to produce a clear yellow solution of solvents and nonchlorophylls. The solvents were removed and recovered by distillation leaving as a result a dark orange colored paste containing mainly carotenoids, fats, waxes, other fat soluble plant constituents, and small amounts of the organic solvents used weighing 48.5 grams. It was treated with 75 ml. of methanol, 25 ml. of acetone, and 20 grams of flake potassium hydroxide under reflux for one hour (reaction is violent, especially at first—caution).

The completely saponified materials were cooled to room temperature and mixed with 2 liters of hexane for ten minutes, filtered through asbestos, and the filtrate extracted with four 250 ml. portions of water to complete the hexane and water extractions which produced the nonsaponifiables and water-soluble chlorophylls and the hexane solubles. Distillation of the hexane effected its recovery and produced 19.4 grams of a pasty residue of impure carotenoids. This was added to 400 ml. of acetone and mixed for thirty minutes, and the insoluble waxes, sterols, etc., separated by filtration, then washed with 100 ml. of fresh acetone.

The filtrates were combined and distilled to recover the acetone and leave a thick viscous residue of carotenoids and phytol weighing about 10.4 grams. This was extracted five times with 25 ml. portions of 90% methanol (10% water). The extracts were combined and evaporated on a steam bath to produce a residue of impure phytol and xanthophylls weighing about 3.8 grams. The extracted residue of purified carotenes resulting from the methanolic extractions weighed 6.3 grams and was dissolved in 125 ml. of isopropanol by stirring and heating. Upon cooling, a mass of deep orange colored crystals (poorly formed crystals) separated. After standing overnight, they were recovered by filtration, redissolved in more isopropanol with stirring and heat. Upon cooling, a mass of dark red colored (well formed) crystals of carotene separated, filtered out, and washed with a small portion of pentane and dried. The yield of carotene crystals was 128 mg. that assayed 96% pure and contained only traces of xanthophylls. The mother liquors were combined, and the solvents removed by heating on a steam bath to produce 5.8 grams of refined carotene. Chemical assay showed this carotene concentrate to contain 2.15% carotenes.

*Example 10*

Fifty grams of the dark orange colored pasty material of carotenoids, fats, waxes, etc., free of solvents was obtained as described hereinabove in Example 1 hereinabove and was treated with 75 ml. of methanol. The mixture was brought to a boil with heat and stirring and then 25 grams of flake potassium hydroxide cautiously added. After boiling to the atmosphere for about fifteen minutes, a reflux condenser was connected, and the saponification continued for ninety more minutes to complete the saponification. The completely saponified materials were cooled to room temperature and stirred with 2 liters of hexane for about fifteen minutes, then filtered through asbestos, and the filtrate washed with six 200 ml. portions of water. The impure carotenoids fraction was obtained by distillation of the hexane, then mixed with 400 ml. of acetone for about one hour. The insoluble waxes, sterols, etc., were separated by filtering and washed with a small amount of fresh acetone.

The acetone was removed from the combined filtrates to produce the carotenoids and phytol fraction. It was treated ten times with 25 ml. portions of 90% methanol. Most of the methanol was recovered by fractional distillation of the combined extracts, and the impure phytol and xanthophyll fraction comprising about 3.5 grams was obtained by completely evaporating the solvents on a steam bath. The purified carotenes fraction resulting from the methanolic extractions, when freed of solvents, weighed 6.7 grams. It was dissolved in 100 ml. of heated isopropanol and then let cool, whereupon a mass of deep orange colored material separated. Upon standing for two days some poorly formed carotene crystals could be seen. The mass was separated from the mother liquor and redissolved in a minimal amount of warmed isopropanol. Upon cooling, well formed carotene crystals formed. These were filtered with suction and washed with cold pentane and dried in a vacuum desiccator. The carotene crystals weighed 142 mg. and assayed more than 95% pure. All mother liquors were combined and freed of solvents on a steam bath, and about 6.3 grams of refined carotene or carotene concentrate containing 2.08% carotenes produced.

What is claimed is:
1. A method of treating papaya plants to recover desired constituents therefrom comprising the steps of:
 (a) extracting a liquid from the plants;
 (b) adjusting the pH of the liquid to the range of approximately 4.0 to 4.5;
 (c) digesting the liquid at not more than approximately 55° C. until a coagulate is formed therein;
 (d) separating the liquid from the coagulate;
 (e) treating the liquid to separate the proteolytic enzymes therefrom;
 (f) treating the remaining liquid to separate carpaines therefrom;
 (g) treating the coagulate to recover carotenoids therefrom; and
 (h) treating the remaining coagulate to recover the chlorophylls therefrom.

2. A method of treating papaya plants to recover desired constituents therefrom comprising the steps of:
 (a) extracting a liquid from the plants;
 (b) adjusting the pH of the liquid to the range of approximately 4.0 to 4.5;
 (c) digesting the liquid at not more than approximately 55° C. until a coagulate is formed therein;
 (d) separating the liquid from the coagulate;
 (e) treating the liquid to separate the proteolytic enzymes therefrom; and
 (f) treating the remaining liquid to separate carpaines therefrom.

3. A method of treating papaya plants to recover desired constituents therefrom comprising the steps of:
 (a) extracting a liquid from the plants;

(b) adjusting the pH of the liquid to the range of approximately 4.0 to 4.5;
(c) digesting the liquid at not more than approximately 55° C. until a coagulate is formed therein:
(d) separating the liquid from the coagulate; and
(e) treating the liquid to separate carpaines therefrom.

4. A method of treating papaya plants to recover desired constituents therefrom comprising the steps of:
(a) treating the plants with an extraction solution;
(b) extracting a liquid from the treated plants;
(c) adjusting the pH of the liquid to the range of approximately 4.0 to 4.5;
(d) digesting the liquid at not more than approximately 55° C. until a coagulated is formed therein:
(e) separating the liquid from the coagulate;
(f) treating the liquid to separate the proteolytic enzymes therefrom,
(g) treating the remaining liquid to separate carpaines therefrom;
(h) treating the coagulate to recover the carotenoids therefrom; and
(i) treating the remaining coagulate to recover the chlorophylls therefrom.

5. A method of treating papaya plants to recover desired constituents therefrom comprising the steps of:
(a) treating the plants with an extraction solution;
(b) extracting a liquid from the treated plants;
(c) adjusting the pH of the liquid to the range of approximately 4.0 to 4.5;
(d) digesting the liquid at not more than approximately 55° C. until a coagulate is formed therein;
(e) separating the liquid from the coagulate;
(f) treating the liquid to separate the proteolytic enzymes therefrom; and
(g) treating the remaining liquid to separate carpaines therefrom.

6. A method of treating papaya plants to recover desired constituents therefrom comprising the steps of:
(a) treating the plants with an extraction solution;
(b) extracting a liquid from the treated plants;
(c) adjusting the pH of the liquid to the range of approximately 4.0 to 4.5;
(d) digesting the liquid at not more than approximately 55° C. until a coagulate is formed therein;
(e) separating the liquid from the coagulate; and
(f) treating the liquid to separate carpaines therefrom.

7. A method of treating papaya plants to recover desired constituents therefrom comprising the steps of:
(a) extracting a liquid from the plants;
(b) adjusting the pH of the liquid to the range of approximately 4.0 to 4.5;
(c) digesting the liquid at not more than approximately 55° C. until a coagulate is formed therein;
(d) separating the liquid to separate the proteolytic enzymes therefrom;
(e) treating the liquid to separate the proteolytic enzymes therefrom;
(f) treating the remaining liquid to separate carpaines therefrom;
(g) dehydrating the coagulate;
(h) treating the coagulate to recover the carotenoids therefrom; and
(i) treating the remaining coagulate to recover the chlorophylls therefrom.

References Cited by the Examiner

UNITED STATES PATENTS 3,141,832    7/1964    Burdick.

OTHER REFERENCES

Burdick: Chemurgic Digest 12, 11 to 13, June-July 1953.
Burdick et al.: Industrial and Engineering Chemistry, vol. 46, pp. 2262–2271, November 1954.
Burdick: Economic Botany 10, 267–279 (1956).
Burdick: Chemurgic Digest 16, No. 7, pages 4 to 6 and 12, July 1957.

A. LOUIS MONACELL, *Primary Examiner.*

L. M. SHAPIRO, *Assistant Examiner.*